J. F. WATTS.
INSECT TRAP.
APPLICATION FILED MAY 17, 1909.

958,786.

Patented May 24, 1910.

2 SHEETS—SHEET 1.

Witnesses

Inventor
James F. Watts,
By Woodward & Chandlee
Attorney

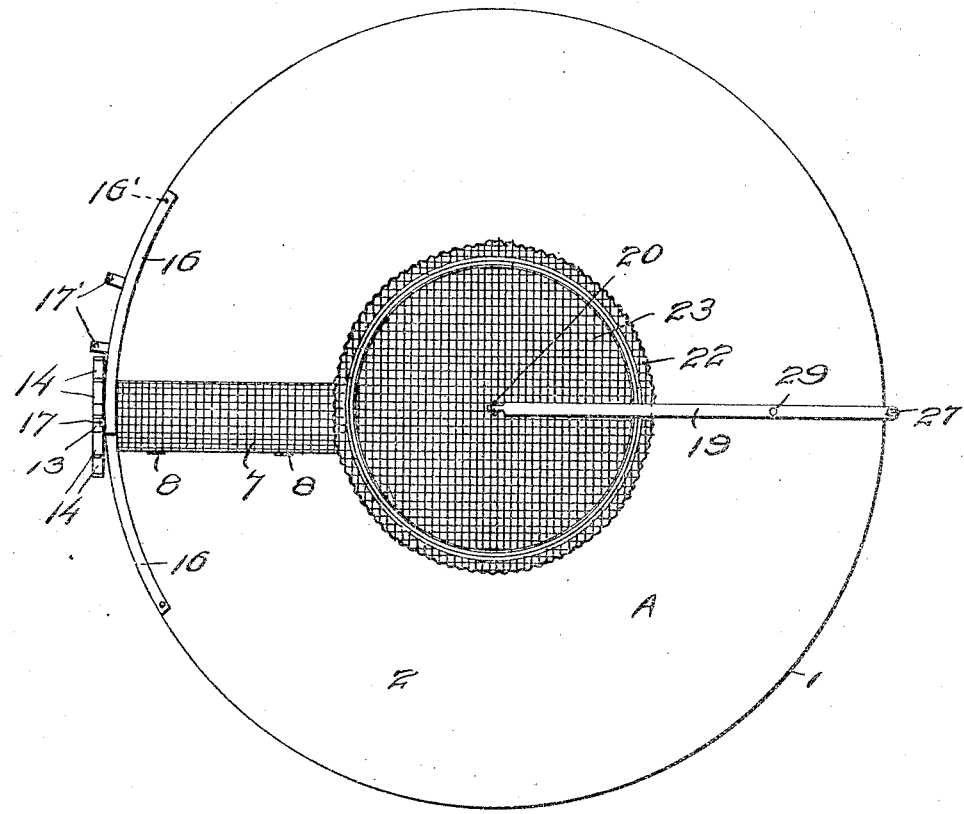
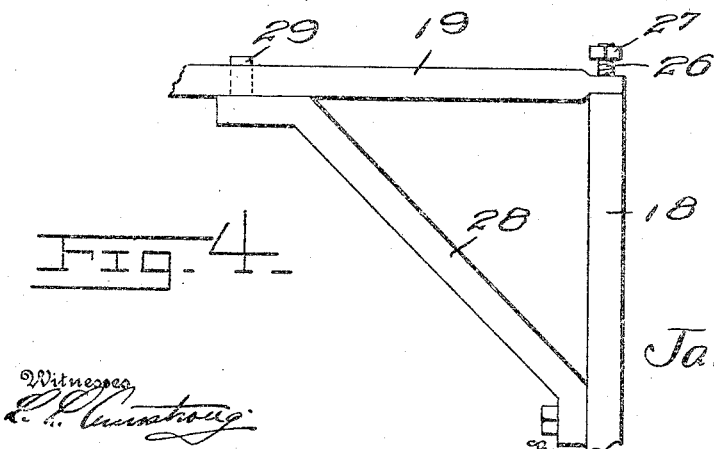

UNITED STATES PATENT OFFICE.

JAMES F. WATTS, OF SPOKANE, WASHINGTON.

INSECT-TRAP.

958,786.   Specification of Letters Patent.   Patented May 24, 1910.

Application filed May 17, 1909. Serial No. 496,423.

*To all whom it may concern:*

Be it known that I, JAMES F. WATTS, a citizen of the United States, residing at Spokane, in the county of Spokane and State of Washington, have invented certain new and useful Improvements in Insect-Traps, of which the following is a specification.

This invention relates to traps, and more particularly to an insect trap, so designed and constructed as to be entirely automatic and instantaneous in its operation.

The primary object of my invention is to provide a trap of this character in which the insect catching member is mounted to revolve from the center of a suitable base or platform, and which is automatically opened and closed upon the start and completion of each rotation thereof.

Another object is to provide a suitable retainer suspended over the center of the platform, the inner end of the catching member being projected through the bottom of the same.

A further object is to provide means for mounting the retainer, whereby the same may be readily lifted and the insects contained therein disposed of.

A further object is to provide suitable mechanism for operating the trap at stated or predetermined intervals.

Other objects and advantages will be apparent from the following description, and it will be understood that changes in the specific structure shown and described may be made within the scope of the claims without departing from the spirit of the invention.

Figure 1:
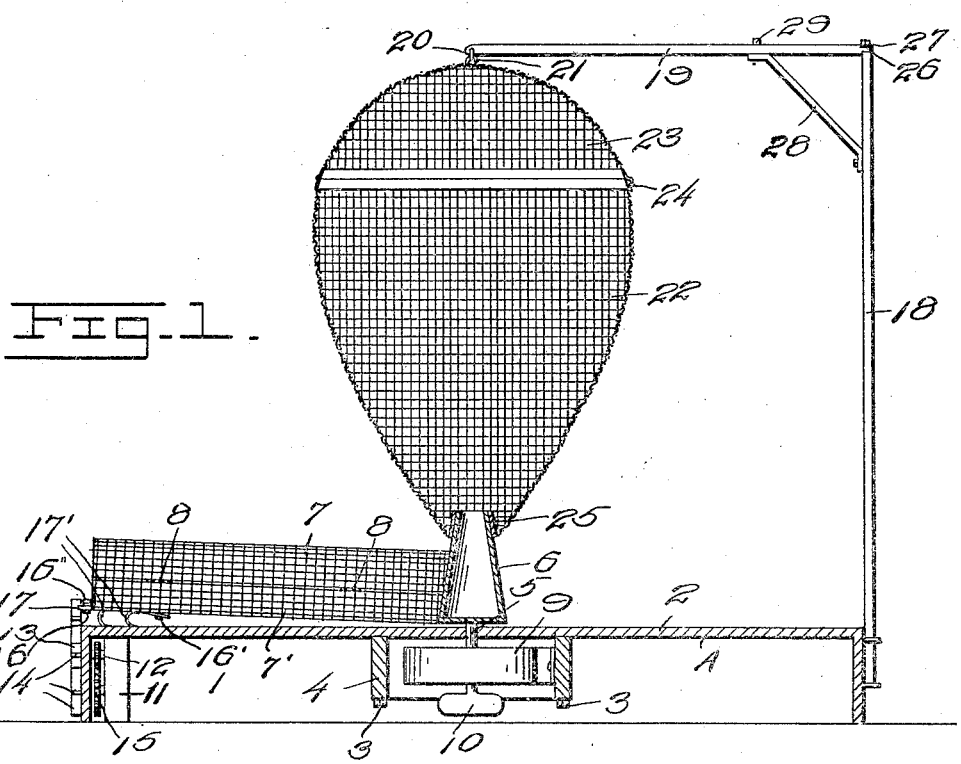
Figure 2:
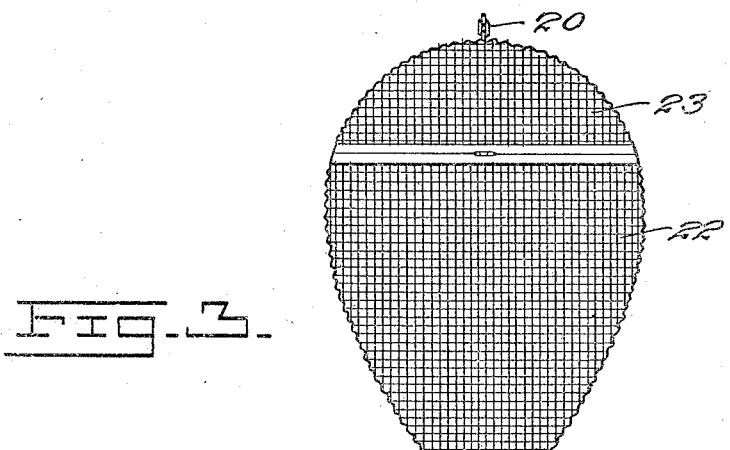

In the drawings forming a portion of this specification, and in which like characters of reference indicate similar parts in the several views, Figure 1 is a vertical section of my improved trap, Fig. 2 is a top plan view thereof. Fig. 3 is a side elevation of the same illustrating the means employed for opening and closing the rotating frame. Fig. 4 is an enlarged detail view of the connections between the horizontal supporting arm of the retaining member and the vertical post secured to the platform.

Referring to the drawings, 1 indicates a casing preferably cylindrical in form, the upper surface of which provides a suitable platform A upon which may be placed any suitable bait for the attraction of the insects. Centrally disposed within the casing and secured to the under side of the plate 2 by means of the bolts 3, is a smaller cylindrical casing 4. Extending centrally therethrough and through the platform 2 is a shaft 5 to the upper end of which is secured the cone-shaped member 6. Secured to the periphery of the member 6, and extending outwardly therefrom substantially the entire radius of the platform is the wire insect catching frame 7. This frame 7 is preferably formed of two semicircular sections, hinged as shown at 8. It will of course be understood that one of the sections 7' is not attached to the member 6, but closely engages upon the periphery of the same when the frame is closed, thus preventing any escape of the insects between the end of the same and the outer circumference of the member 6. The frame 7 is adapted to revolve upon the platform, and to provide for such revolution a spring 9 is disposed within the casing 4 and has one of its ends secured to the vertical shaft 5 the other end being secured to the side of the casing 4. The end of the shaft is provided with a thumb piece 10 by means of which the spring may be wound.

A casing 11 is provided beneath the platform A adjacent one side, in which is disposed upon the shaft 12 the mechanism by means of which the trap frame is held against revolution. This mechanism comprises the revoluble wheel 13 in the periphery of which is secured a plurality of arms 14. This wheel 13 is revolved intermittingly by means of an automatic clock mechanism 15, as shown in the drawings, but which will not be further described, its mechanism being quite familiar to those skilled in the art. Bars or rods 16 and 16'' are suitably supported above the platform 2, at the edge thereof, the upper or inner ends thereof being disposed in parallel relation, and some distance above the surface of the platform 2. One of the bars 16 is provided at its lower end with a lug 16', the purpose of which will appear later. Thus it will be seen from reference to Fig. 3 that the bars 16 and 16'' are inclined and are engaged by the lug 17 carried by the end of the frame 7. This lug is normally disposed between the raised ends of the rods 16 and 16'', and is engaged by any one of the arms 14 secured in the periphery of the wheel 13. Thus the frame is held against rotation until such time as the arm 14 is moved out of engagement with the lug 17 carried by the frame. When this occurs, the frame 7 will be revolved by the spring 9, and the lug 17 will engage with rod 16″. Upon the continued movement of the frame, and owing to the inclined position of the rod, the sections of the frame will be gradually opened, and when the lug 17 has passed beyond the end of the rod 16″, the frame will be in its full open position as shown in dotted lines in Fig. 3. As the spring 9 is considerably high in tension, the frame will be very rapidly revolved and the insects which have been attracted upon the platform will be caught therein. So swift will be the revolution of the frame 7, that before the insects have had time to escape the lug 17 will again engage with the rod 16, and the sections of the frame securely closed. Bar 16″ is supported above the platform by the braces 17′ and has its elevated end disposed above the inner end of the other bar. The lug 17 will remain in engagement with one of the arms 14 until the frame has reached the end of the bar 16, when the lug will engage with the under surface of the bar 16″. At the lower end of this bar the lug 17 will engage with the lug 16′ and the frame will be opened to its fullest extent, or until the edge of the lower section contacts with the surface of the platform.

Secured to the casing 1 is one end of a vertical post, or standard 18 upon the upper end of which is loosely mounted for rotative movement the horizontal arm 19. The outer end of this arm 19 is provided with a ring 20, in which is engaged the hook 21 upon the insect retaining member 22. The member 22 is preferably formed of wire netting, and has the hinged top 23, which may be secured to the body thereof by means of a catch 24. This retaining member is substantially oval in outline and has secured centrally in the bottom thereof the inwardly extending passage 25, the inner periphery of which is disposed at an angle in alinement with the periphery of the cone-shaped member 6, the upper end of which extends a short distance therein. Thus it will be seen that after the flies have been caught in the trap frame 7 they will, in their efforts to escape therefrom pass into the member 6, and into the retaining member 22. As the engaging portions of the member 22 and the member 6 are of solid sheet metal construction all attempts of the insects to escape between the same will be frustrated. The upper end of the standard 18 is provided with a short screw-threaded stud 26 over which the end of the horizontal supporting bar 19 is engaged. A nut 27 is threaded upon the end of the rod but allows of a certain amount of vertical movement of the bar 19, so that the retaining member may be disengaged from the member 6. The brace bar 28 has one of its ends secured to the standard 18, the other end being extended parallel to the bar 19 and provided with a pin 29, which extends through an opening in the bar. By this means instead of entirely removing the retainer, the nut 27 may be removed and the end of the arm disengaged from the stud 26, and the arm rotated upon the pin 29 to such a position that the retainer may be deposited in a receptacle containing water or other means of killing the insects.

From the foregoing, it will be seen that I have provided a very novel and simple construction of insect trap which is instantaneously and automatically operated, and whereby the insects may be rapidly disposed of as they are caught. It requires no attention whatever beyond the winding of the spring 9 and the removing of the retainer when a sufficient quantity of insects have been trapped. By providing the funnel-shaped entrance 25 in the bottom of the retainer 22 the escape of the insects therefrom is rendered exceedingly difficult if not impossible when the retainer is removed from the upper end of the cone-shaped member 6.

A trap constructed as above described is admirably adapted for use in dining rooms and cafés where flies accumulate in great numbers and become exceedingly annoying. By placing a small quantity of any suitable bait upon the platform A the flies will be attracted thereto in large numbers, and as the rotation of the frame is instantaneous the catching of the same is rendered practically certain.

While I have described the rotating frame and the retaining member as being constructed of wire netting, it will be obvious that the same may also be formed of sheet metal, but the wire construction is preferably devised for the reason that flies will not die in the trap, where, should they become lodged in any of the crevices of the same, they would exude a disagreeable odor.

My improved trap is exceedingly inexpensive to manufacture, easy to operate and highly efficient and durable in use.

What is claimed is:

1. A trap comprising a base, a frame rotatably mounted upon said base and comprising two hinged sections forming a passage, a central cage, said passage communicating with the interior of the cage, means for rotating the frame, means for stopping the rotation of said frame at times, bars supported above said base, a lug on one of said bars, said bars being inclined upwardly toward each other, and a lug formed upon the end of one of the sections of said frame adapted to engage with said bars.

2. A trap comprising a base, a frame rotatably mounted upon said base and comprising two hinged sections, a hollow cone-shaped member, the inner end of said sections being disposed upon the periphery thereof, means for rotating the frame, means for stopping the rotation of said frame at intervals, bars supported above said base, a lug on one of said bars, said bars being inclined upwardly toward each other, a lug formed upon the end of one of the sections of said frame adapted to engage with said bars, and a wire retaining cage suspended above the base, the upper end of the cone-shaped member extending into the bottom thereof.

3. In a trap of the character described, the combination with a casing, a circular platform secured to said casing, a wire frame rotatably mounted upon said platform, a hollow cone-shaped member concentrically disposed upon said platform, a shaft secured to said member and extending into a second casing, said second casing secured to the under side of said platform, a spring located therein and engaged with the shaft for rotation thereof, a standard secured to the periphery of said first mentioned casing, a horizontal arm having one end removably secured to said standard, a brace bar secured to the standard and having one end disposed in parallel relation with said arm, a pin formed on the end of said bar and extending through said arm, a wire retaining cage removably held upon the outer end of said horizontal arm, said cage being substantially oval in outline and provided in its lower end with a sheet metal inwardly extending conical tube adapted to be inserted over the upper open end of the centrally disposed hollow cone, and means for checking rotation of the frame at times.

4. In a trap of the character described, the combination with a platform, of a frame rotatably mounted thereon, means for rotating the frame, said frame being formed of two hinged sections, means secured upon said platform for opening and closing said sections, the end of one of said sections being provided with an outwardly extending lug, a revoluble member disposed adjacent the platform, means for rotating the member, a plurality of arms carried by said member, said arms being adapted to engage with the lug upon said frame to hold the same against rotation, and means supported upon said platform and suspended over the inner end of said frame to receive the contents thereof.

5. In a trap of the character described, the combination with a cylindrical base, of a frame rotatably mounted upon said base and comprising two hinged sections; a hollow cone-shaped member, the inner end of said sections being disposed upon the periphery thereof; means for rotating the frame, means for stopping the rotation of said frame at times, inclined bars arranged on said base, braces secured to said base to support one of said bars out of contact therewith, the other of said bars having one of its ends secured to said base, a depending lug upon the lower end of said first mentioned bar, a lug formed upon the end of one of the sections of said frame adapted to engage with the lug carried by said bar, and means suspended above the frame for removing the insects therefrom.

In testimony whereof I affix my signature, in presence of two witnesses.

JAMES F. WATTS.

Witnesses:
J. O. KILDEA,
F. GALLAGHER.